US010059136B2

(12) United States Patent
Tomomatsu

(10) Patent No.: US 10,059,136 B2
(45) Date of Patent: Aug. 28, 2018

(54) IMAGE DATA STORAGE IN A PRINTER AND NON-TRANSITORY COMPUTER-READABLE MEDIUM STORING INSTRUCTIONS THEREFOR

(71) Applicant: Brother Kogyo Kabushiki Kaisha, Nagoya-shi, Aichi-ken (JP)

(72) Inventor: Yoshitsugu Tomomatsu, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/079,575

(22) Filed: Mar. 24, 2016

(65) Prior Publication Data

US 2016/0361933 A1 Dec. 15, 2016

(30) Foreign Application Priority Data

Jun. 12, 2015 (JP) .................................. 2015-119018

(51) Int. Cl.
*B41J 29/38* (2006.01)
*G06F 3/12* (2006.01)
*H04N 1/00* (2006.01)

(52) U.S. Cl.
CPC ............ *B41J 29/38* (2013.01); *G06F 3/1204* (2013.01); *G06F 3/1209* (2013.01); *G06F 3/1236* (2013.01); *G06F 3/1284* (2013.01); *H04N 1/00127* (2013.01); *G06F 3/128* (2013.01);
(Continued)

(58) Field of Classification Search
None
See application file for complete search history.

(56) References Cited

U.S. PATENT DOCUMENTS

| 9,389,815 B2 | 7/2016 | Moriyama |
| 2003/0196011 A1 | 10/2003 | Shih |
| 2006/0023253 A1 | 2/2006 | Byun et al. |

(Continued)

FOREIGN PATENT DOCUMENTS

| JP | 2007-109251 A | 4/2007 |
| JP | 2008-152545 A | 7/2008 |

(Continued)

OTHER PUBLICATIONS

Jul. 3 2018—(JP) Notification of Reasons for Rejection—App 2015-119018.

*Primary Examiner* — Miya J Williams
(74) *Attorney, Agent, or Firm* — Banner & Witcoff, Ltd.

(57) ABSTRACT

A printer includes a print portion, a connection portion, a storage device, a processor and a memory. The connection portion is configured to be USB-connected with an external device. The storage device has a mass storage area accessible by the external device connected via the connection portion. The memory is configured to store computer-readable instructions that, when executed by the processor, instruct the processor to perform steps of establishing a connection with the external device via the connection portion, using a mass storage class and storing image data in the mass storage area. The image data is data representing an image. The image data is transmitted from the external device via the connection portion. The computer-readable instructions further cause the printer to perform a step of printing the image on the recording medium by controlling the print portion based on the stored image data.

10 Claims, 7 Drawing Sheets

(52) U.S. Cl.
    CPC .......... *G06F 3/1247* (2013.01); *G06F 3/1257* (2013.01); *G06F 3/1274* (2013.01)

(56) References Cited

U.S. PATENT DOCUMENTS

| | | | |
|---|---|---|---|
| 2008/0140964 A1* | 6/2008 | Li ........................... | G06F 3/147 |
| | | | 711/162 |
| 2010/0060916 A1* | 3/2010 | Hattori ............... | H04N 1/00954 |
| | | | 358/1.9 |
| 2010/0225962 A1* | 9/2010 | Okigami ............. | H04L 63/0492 |
| | | | 358/1.15 |
| 2011/0160875 A1* | 6/2011 | Taguchi ................. | G06F 9/485 |
| | | | 700/17 |
| 2013/0188224 A1* | 7/2013 | Moriyama ............ | G06F 3/1204 |
| | | | 358/1.15 |
| 2014/0268225 A1* | 9/2014 | Shibukawa ........ | H04N 1/00204 |
| | | | 358/1.15 |
| 2014/0293311 A1* | 10/2014 | Hata ................. | H04N 1/00278 |
| | | | 358/1.13 |
| 2015/0116765 A1* | 4/2015 | Kubota ............. | H04N 1/00946 |
| | | | 358/1.15 |

FOREIGN PATENT DOCUMENTS

| | | |
|---|---|---|
| JP | 2010-069681 A | 4/2010 |
| JP | 2012-209786 A | 10/2012 |
| JP | 2013-025439 A | 2/2013 |
| JP | 2013-097499 A | 5/2013 |

\* cited by examiner

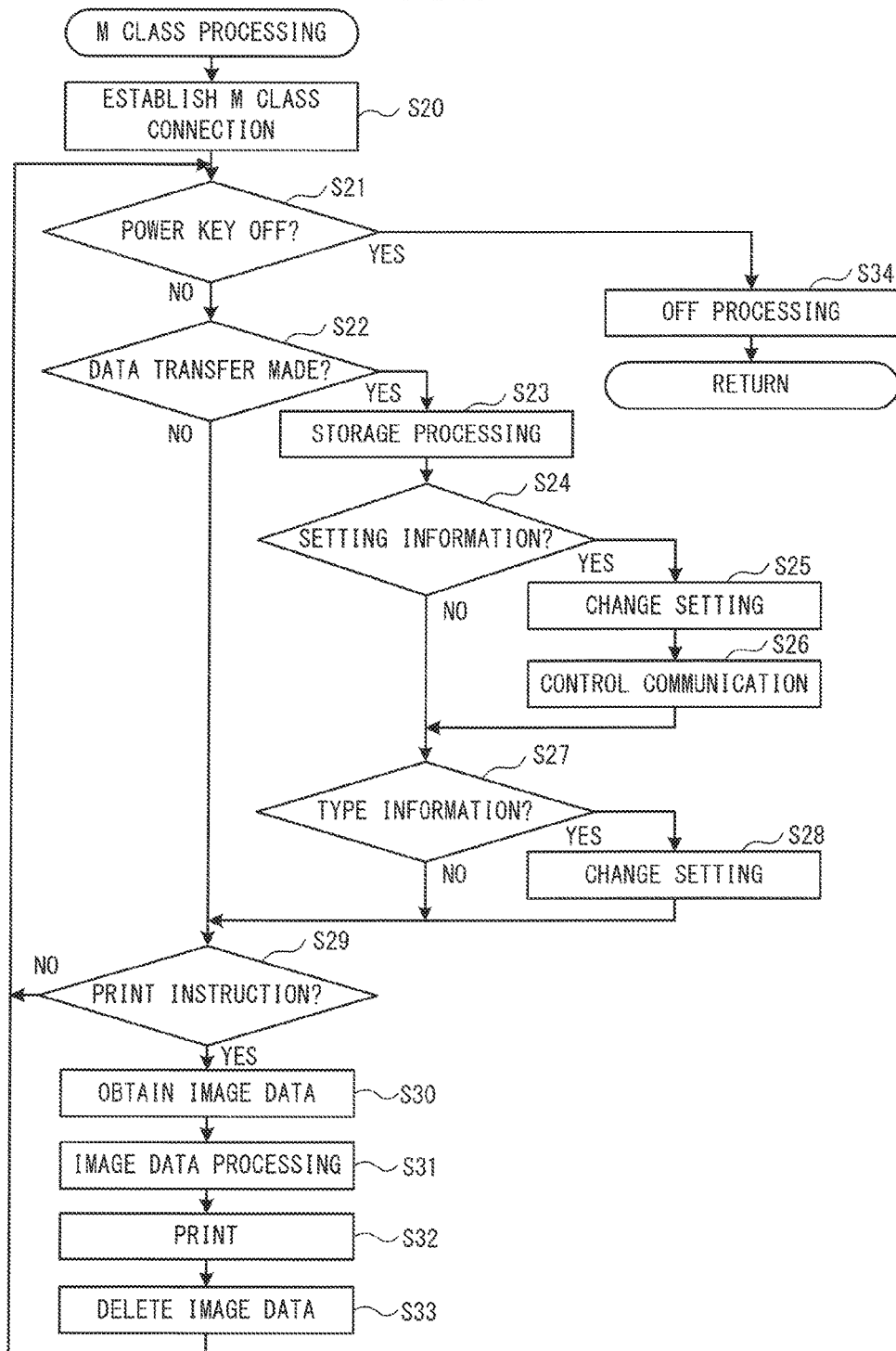

IMAGE DATA STORAGE IN A PRINTER AND NON-TRANSITORY COMPUTER-READABLE MEDIUM STORING INSTRUCTIONS THEREFOR

CROSS-REFERENCE TO RELATED APPLICATION

This application claims priority to Japanese Patent Application No. 2015-119018 filed Jun. 12, 2015, the content of which is hereby incorporated herein by reference in its entirety.

BACKGROUND

The present disclosure relates to a printer that can be connected via a Universal Serial Bus (USB) and a non-transitory computer-readable medium.

Various printers have been considered that can perform printing by being directly connected to an external device without being connected via a personal computer (hereinafter referred to as a "PC"), where the external device can be USB-connected to the PC. A known external device (peripheral device) can function as a virtual USB host with respect to the printer, for example. The known external device can cause the printer to perform the following processing while being connected to the printer as the virtual USB host. The printer obtains print data and control instructions that are used when printing from the external device. The printer performs the printing based on the obtained data and in accordance with the obtained control instructions.

SUMMARY

In the above-described known technology, it is necessary for the external device to control the printer, and it is also necessary to significantly change specifications of the control commands of the external device.

Embodiments of the broad principles derived herein provide a printer and a non-transitory computer-readable medium that are capable of performing printing while being directly connected to an external device without significantly changing specifications of the external device.

Embodiments provide a printer includes a print portion, a connection portion, a storage device, a processor and a memory. The connection portion is configured to be USB-connected with an external device. The storage device has a mass storage area accessible by the external device connected via the connection portion. The memory is configured to store computer-readable instructions that, when executed by the processor, instruct the processor to perform steps of establishing a connection with the external device via the connection portion, using a mass storage class and storing image data in the mass storage area. The image data is data representing an image. The image data is transmitted from the external device via the connection portion. The computer-readable instructions further cause the printer to perform a step of printing the image on the recording medium by controlling the print portion based on the stored image data.

Embodiments further provide a non-transitory computer-readable medium storing computer-readable instructions. When executed by a processor of a printer, the computer-readable instructions cause the printer to perform a step of establishing a connection with an external device via a connection portion of the printer using a mass storage class. The connection portion is configured to be USB-connected with the external device. The computer-readable instructions also cause the printer to perform a step of storing image data in a mass storage area of a storage device of the printer. The image data is data representing an image. The image data is transmitted by the external device via the connection portion. The mass storage area being accessible by the external device connected via the connection portion. The computer-readable instructions further cause the printer to perform a step of printing the image on the recording medium by controlling a print portion of the printer based on the stored image data. The print portion is configured to perform printing on the recording medium.

BRIEF DESCRIPTION OF THE DRAWINGS

Embodiments will be described below in detail with reference to the accompanying drawings in which:

FIG. 7 is a flowchart of M class processing performed in the main processing in FIG. 6.

DETAILED DESCRIPTION

Figure 1:
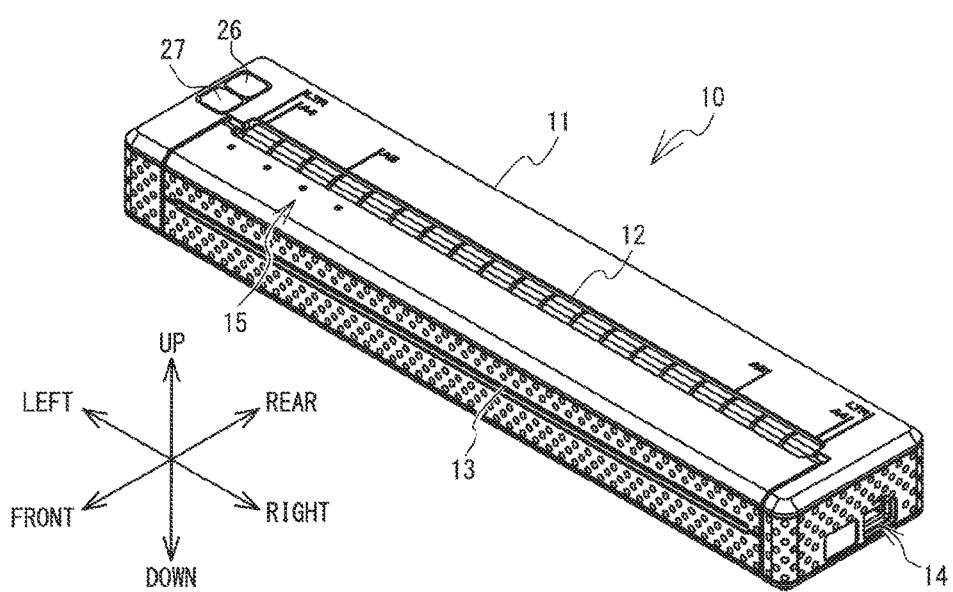
FIG. 1 is a perspective view of a printer 10.

An embodiment of a print system 1, a printer 10, and an image reading device 40 that embody the present disclosure will be described below with reference to the accompanying drawings. In the description below, up and down, left and right, and front and rear directions that are indicated by arrows in the drawings will be used.

An outline configuration of the printer 10 will be described below with reference to FIG. 1. The printer 10 is a thermal printer that is configured to be small and lightweight enough to be portable. As shown in FIG. 1, the printer 10 includes a casing 11, a paper feed portion 12, a paper discharge portion 13, a connection portion 14, a display portion 15, and operation keys 26 and 27. The casing 11 has a long substantially box-shaped external appearance. The casing 11 includes a print portion 25 (see FIG. 2) in the interior thereof. The print portion 25 has a function to perform printing on a recording medium. Specifically, the print portion 25 is provided with a roller and a head (not shown in the drawings). The roller is configured to convey the recording medium. The head is configured to perform the printing on the recording medium. The paper feed portion 12 is an opening to feed the recording medium, such as a heat-sensitive paper and the like, to the print portion 25. The paper feed portion 12 is provided on an upper surface of the casing 11. The paper discharge portion 13 is an opening to discharge the recording medium on which the printing has been already performed. The paper discharge portion 13 is provided in a front surface of the casing 11. The connection portion 14 is a connector to which a USB cable 51 (see FIG. 2) can be connected. The display portion 15 consists of light-emitting diodes (LED) that display a communication status of the printer 10. The operation keys 26 and 27 are used to input various instructions into the printer 10. In the printer 10 of the present embodiment, the operation key 26 is operated to switch the printer 10 ON and OFF. The operation key 27 is operated to input an instruction to drive the roller so as to convey the recording medium.

Figure 2:
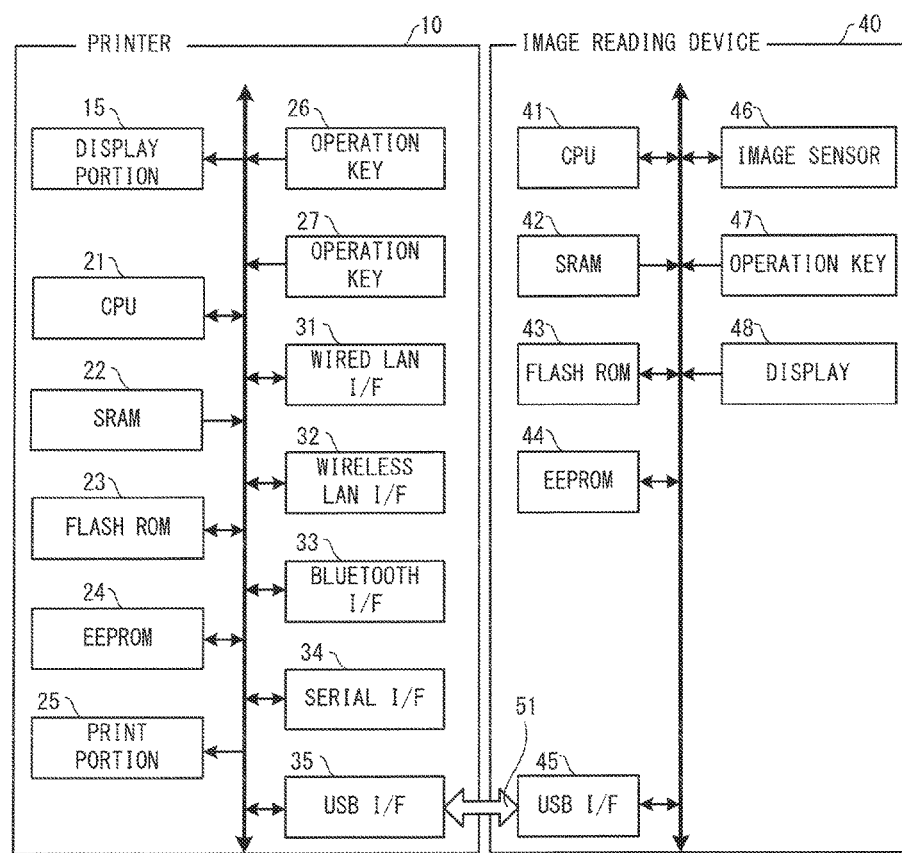
FIG. 2 is a block diagram showing electrical configurations of the printer 10 and an image reading device 40, both of which are provided in a print system 1.

With reference to FIG. 2, electrical configurations of the printer 10 and the image reading device 40, both of which are provided in the print system 1, will be described below. The printer 10 is provided with a CPU 21 that is configured to perform overall control of the printer 10. The printer 10 is further provided with the display portion 15, a SRAM 22, a FLASH ROM 23, an EEPROM (a registered trademark) 24, the print portion 25, the operation keys 26 and 27, a wired LAN interface (hereinafter an interface is referred to as an "I/F") 31, a wireless LAN I/F 32, a Bluetooth (registered trademark) I/F 33, a serial I/F 34, and a USB I/F 35. A timer, a counter, and temporary data are stored in the SRAM 22. The SRAM 22 will be further described below with reference to FIG. 3. A control program of the CPU 21 may be stored in the FLASH ROM 23. The FLASH ROM 23 will be further described below with reference to FIG. 4. In the EEPROM 24, setting information may be stored that is necessary to perform communication by using the control program (see FIG. 4) that will be described below.

The wired LAN I/F 31 is a controller to perform communication in accordance with a communication system based on the wired LAN standard. One example of the communication system based on the wired LAN standard is a TCP/IP. Hereinafter, performing communication in accordance with the communication system based on the wired LAN standard may also be described as performing wired LAN communication. The wireless LAN I/F 32 is a controller to perform wireless LAN communication. The Bluetooth I/F 33 is a controller to perform communication in accordance with a communication system based on the Bluetooth standard. Hereinafter, performing communication in accordance with the communication system based on the Bluetooth standard may also be described as performing Bluetooth communication. The serial I/F 34 is a controller to perform communication in accordance with a communication system based on the serial communication standard. Examples of the communication system based on the serial communication standard include RS-232C and RS-485. Hereinafter, performing communication in accordance with the communication system based on the serial communication standard may also be described as performing serial communication. The USB I/F 35 is a controller to perform communication in accordance with a communication system based on the USB standard. Hereinafter, performing communication in accordance with the communication system based on the USB standard may also be described as performing USB communication. The CPU21 is configured to control a display mode of the four LEDs provided in the display portion 15, according to an operational status of the wired LAN I/F 31, the wireless LAN I/F 32, the Bluetooth I/F 33, the serial I/F 34, and the USB I/F 35.

The image reading device 40 is configured to read an image and generate image data. The image reading device 40 is provided with a CPU 41 that is configured to perform overall control of the image reading device 40. The image reading device 40 is further provided with a SRAM 42, a FLASH ROM 43, an EEPROM 44, a USB I/F 45, an image sensor 46, an operation key 47, and a display 48.

A timer, a counter, and temporary data may be stored in the SRAM 42. An image read by the image sensor 46 may be temporarily stored in the SRAM 42. A control program of the CPU 41 may be stored in the FLASH ROM 43. An execution file for an application that is executed in an external device (a PC, for example) may be stored in the FLASH ROM 43. Parameters and reading conditions may be stored in the EEPROM 44. The parameters include an optimum driving parameter used when the CPU 41 drives the image sensor 46 and a light intensity parameter for a light (not shown in the drawings) irradiated onto a document, for example. The reading conditions include the number of pixels used when reading an image, monochrome or color, and a density, for example. The USB I/F 45 is a controller to control communication performed via the connection portion 14. A USB memory can be connected to the image reading device 40, for example. The image reading device 40 has a "SCAN TO USB" function by which the image data generated by the image sensor 46 may be stored in the USB memory. The image sensor 46 is a CCD-type sensor or a CIS-type sensor used to read an image from a document set on a document placement table. The operation key 47 may be operated to input various instructions to the image reading device 40. The instructions and the like that are input to the image reading device 40 may be displayed on the display 48.

Figure 3:
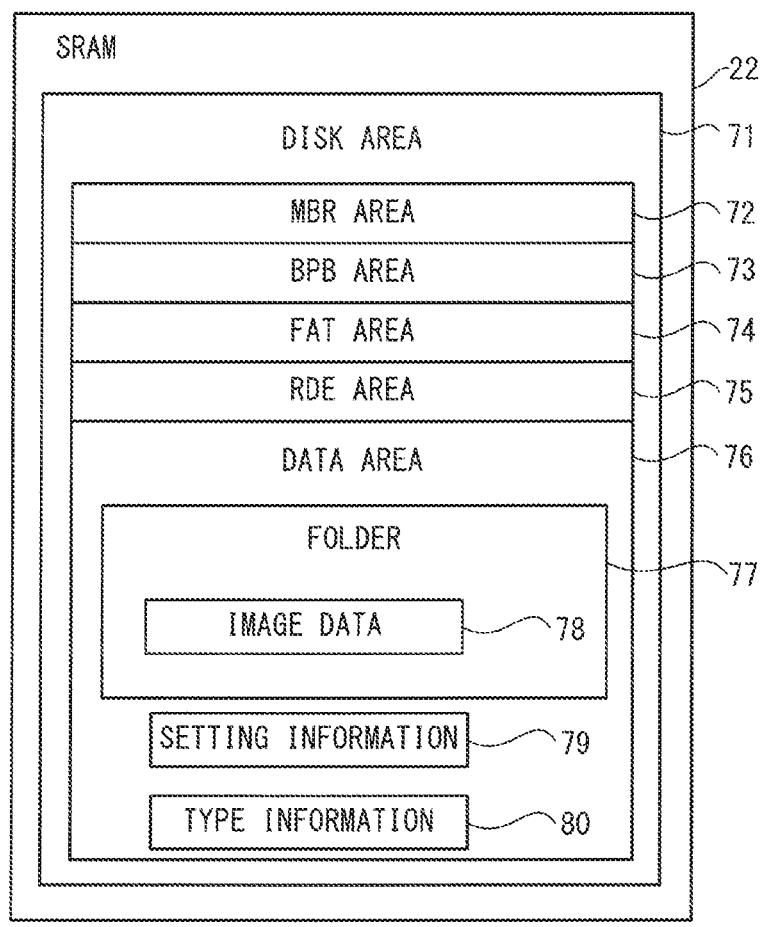
FIG. 3 is an explanatory diagram showing a configuration of a SRAM 22.

With reference to FIG. 3, the SRAM 22 of the printer 10 will be described below. The SRAM 22 is provided with a DISK area 71. The DISK area 71 is set so as to be usable as a USB mass storage area in a state in which the printer 10 is recognized by the external device as a mass storage device. In the present embodiment, File Allocation Tables (FAT) are adopted as a file system to manage files and directories in the DISK area 71. Therefore, in the DISK area 71, a Master Boot Record (MBR) area 72, a BIOS Parameter Block (BPB) area 73, a FAT area 74, a Root Directory Entry (RDE) area 75, and a DATA area 76 are provided.

The MBR area 72 may store a file system type of each partition in the DISK area 71 and a leading sector of the BPB area 73. The BPB area 73 may store, as FAT configuration information, physical attributes, such as the number of bytes in one sector, which is a minimum recording unit (a physical format), and the number of sectors in one cluster, which is a reading and writing unit of an actual file. The FAT area 74 may store a table that can be used to manages an arrangement of plural pieces of data (more specifically, data locations of a file), each of which are arranged in a distributed manner in the DATA area 76. The FAT area 74 has a structure that indicates continuous data areas by recording the next cluster information in each sector that constitutes the FAT. The RDE area 75 may store file information data (file names, first cluster locations, updated dates and time, file sizes, and the like), which are attribute information of the files stored in the DISK area 71.

The DATA area 76 may store actual data of various files using a cluster as a unit. In the present embodiment, a folder 77 having a name corresponding to the external device that is USB-connected via the connection portion 14 may be created in the DATA area 76. Image data 78 that are obtained from the external device may be stored in the folder 77. The image data may be any data that represent an image. The image data are data based on a JPEG format, a Portable Network Graphics (PNG) format, a Tagged Image File Format (TIFF), a Graphics Interchange Format (GIF), a Bitmap (BMP) format, or a Portable Document Format (PDF) format, for example. The image data may also be print data.

The DATA area 76 may store setting information 79 and type information 80 that are transferred from the external device. The setting information is information, transmitted from the external device, which is necessary for the external device to perform communication based on a specific communication system. The printer 10 of the present embodiment can communicate with the external device based on the four types of the communication system, namely, the wireless LAN communication, the Bluetooth communication, the serial communication, and the USB communication. Information included in the setting information is different depending on the type of the communication system. For example, the setting information relating to the wireless LAN communication includes a user ID, a wireless mode, an SSID, an encryption system, and an encryption key. The user ID is information for an access point (not shown in the drawings) to identify the printer 10. The wireless mode, the SSID, the encryption system, and the encryption key are information necessary to perform the wireless LAN communication with the access point. The type information is information to identify a type of the file format (a jpg format, for example) of the image data to be printed. The file format specified in the type information is a file format selected from file formats in which the printer 10 can perform image processing or can convert the file into the print data, for example.

Figure 4:
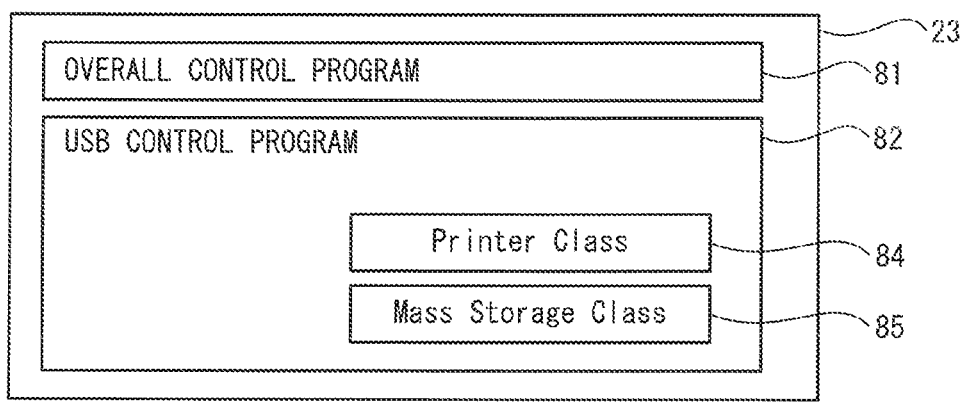
FIG. 4 is an explanatory diagram showing a configuration of a FLASH ROM 23.

With reference to FIG. 4, the FLASH ROM 23 will be described below. The FLASH ROM 23 may store an overall control program 81 and a USB control program 82. The overall control program 81 includes high-level control programs of control programs executed by the CPU 21. The overall control program 81 includes main programs for causing the CPU 21 to control an overall operation of the printer 10. For example, the main programs include programs that give instructions to perform file operations, such as writing and reading, make a judgement based on the content of the file, determine the type of the communication system, communication control, and issue commands to various driver programs, and the like.

The USB control program 82 is a program for causing the CPU 21 to perform a protocol control of the communication performed via the connection portion 14 (see FIG. 1). Specifically, the USB control program 82 includes a printer class driver (hereinafter referred to as a "P class") 84 and a mass storage class driver (hereinafter referred to as an "M class") 85.

The P class 84 can cause the external device (the PC, for example) to recognize the printer 10 as a printer device when the external device is connected to the printer 10 via the connection portion 14 (see FIG. 1). When the external device recognizes the printer 10 as the printer device, the external device can cause the printer 10 to perform print processing using a similar control method to that of a known printer. The external device can cause the printer 10 to perform the print processing based on data by transmitting data to the printer 10, for example.

The M class 85 can cause the external device to recognize the printer 10 as a mass storage device when the external device is USB-connected to the printer 10. When the external device recognizes the printer 10 as the mass storage device, the external device can read information directly from the DISK area 71 of the SRAM 22 of the printer 10. When the external device recognizes the printer 10 as the mass storage device, the external device can write information directly into the DISK area 71 of the SRAM 22 of the printer 10.

The printer 10 may enable one of the P class 84 and the M class 85 according to the status of the operation key 27 (see FIG. 2) at a time when a power ON instruction is input. By switching the status of the operation key 27, a user can switch between causing the external device to recognize the printer 10 as the mass storage device and causing the external device to recognize the printer 10 as the printer device.

Figure 5:
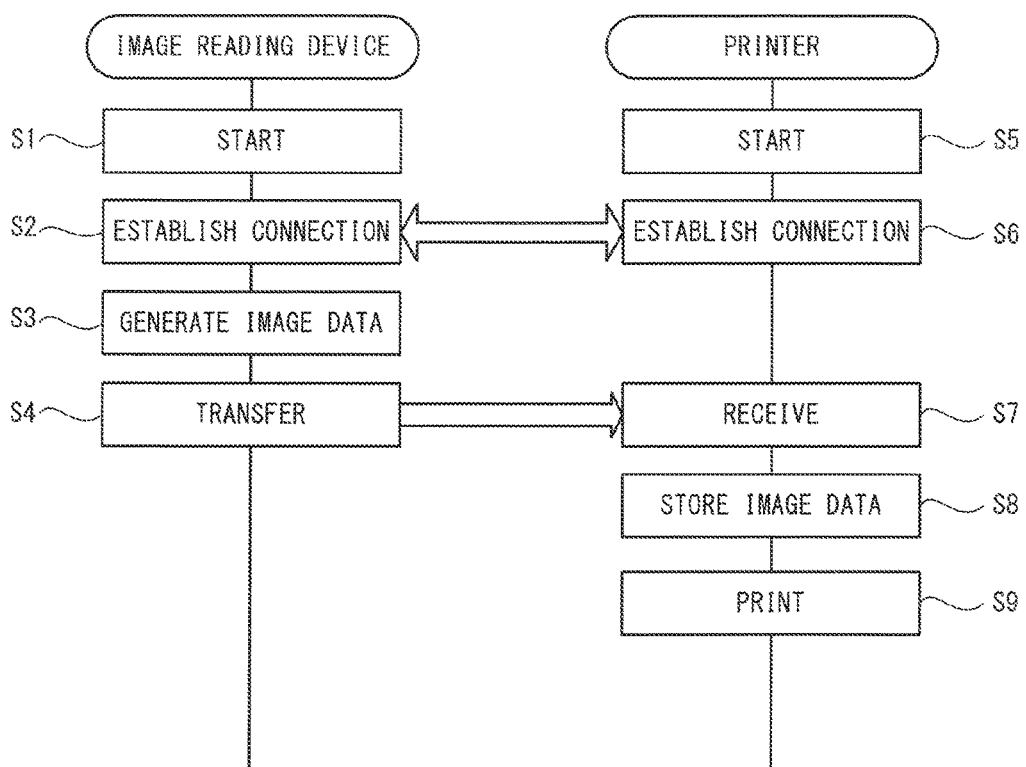
FIG. 5 is an explanatory diagram of processing in which print processing is performed in the printer 10 based on image data generated by the image reading device 40 in a state in which the printer 10 and the image reading device are USB-connected with each other in the print system 1.

With reference to FIG. 5, an outline of processing will be described in which, in the print system 1, the print processing is performed in the printer 10 based on the image data generated by the image reading device 40 in a state in which the printer 10 and the image reading device 40 are USB-connected with each other using a USB cable 51. Processing of the image reading device 40 is performed by the CPU 41 according to the control program of the FLASH ROM 43. Processing of the printer 10 is performed by the CPU 21 according to the overall control program 81. Hereinafter, a step will be abbreviated to "S".

When the power of the image reading device 40 is turned ON, the CPU 41 of the image reading device 40 performs start processing (S1). When the power of the printer 10 is turned ON, the CPU 21 of the printer 10 performs start processing (S5). The CPU 41 of the image reading device 40 causes the image reading device 40 to be USB-connected with the printer 10 with the image reading device 40 as a USB host (S2). The printer 10 establishes a connection with the image reading device 40 via the connection portion 14, using the M class 85 (S6).

After the connection is established, the image reading device 40 reads an image and generates image data based on the user's instruction (S3). For example, the user's instruction is "SCAN TO USB" that is input based on an operation of the operation key 47 of the image reading device 40. "SCAN TO USB" is an instruction to read an image, generate image data, and transfer the generated image data to the external device that is connected with the image reading device 40 using the mass storage class. The user's instruction may be "SCAN TO PRINTER" instead of "SCAN TO USB." "SCAN TO PRINTER" is an instruction to read an image, generate image data, and transfer the generated image data to the printer 10 that is connected with the image reading device 40 using to the M class 85. In the image reading device 40 that is configured so that "SCAN TO PRINTER" can be selected when the image reading device 40 recognizes the printer 10 as the mass storage device, it is easy for the user to select a correct transfer destination of the image data. The image reading device 40 can recognize the device, which is recognized as the mass storage device, as the printer 10 based on information obtained in a process of establishing the connection with the printer 10.

The image reading device 40 transfers the generated image data to the printer 10, and writes the transferred image data in a mass storage area (the DISK area 71) of the printer 10 (S4). The printer 10 receives the image data transferred from the image reading device 40 (S7). The printer 10 stores the image data transmitted from the image reading device 40 via the connection portion 14 in the mass storage area (S8). The printer 10 controls the print portion 25 based on the stored image data, and prints, on a recording medium, an image represented by the image data (S9).

Figure 6:
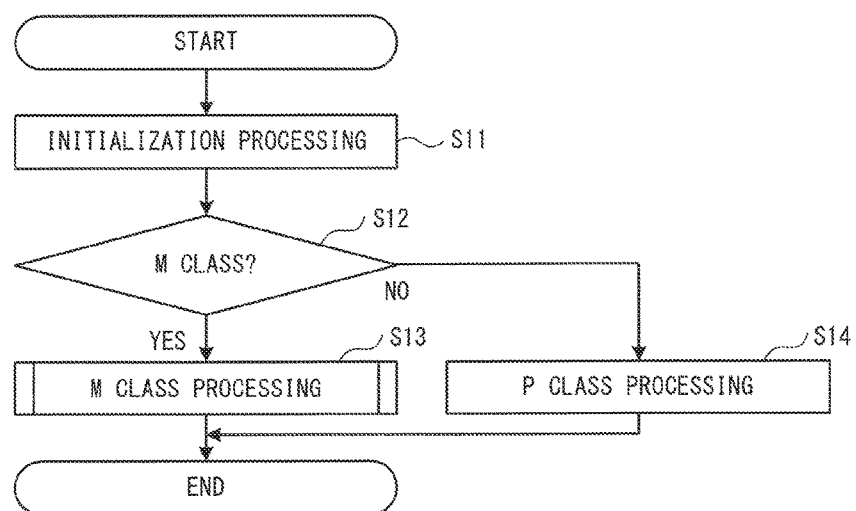
FIG. 6 is a flowchart of main processing performed in the printer 10.

With reference to FIG. 6, main processing performed by the printer 10 will be described below. The main processing is started when the power of the printer 10 is turned ON. When the CPU 21 detects that the power is turned ON, the CPU 21 reads out to the SRAM 22 a program to perform the main processing that is stored in the FLASH ROM 23, and performs processing at each step described below according to instructions included in the program. Various setting values necessary for the processing may be stored in the FLASH ROM 23 in advance.

As described in FIG. 6, the CPU 21 performs initialization processing (S11). In the initialization processing, an operational check of the print portion 25 (see FIG. 2) is performed. As a result of this, the printer 10 is put into a state in which the printer 10 can perform the print processing according to a print instruction from the external device.

The CPU 21 determines whether or not to enable the M class 85 (see FIG. 4) based on the status of the operation keys 26 and 27 (S12). In the present embodiment, when both of the operation keys 26 and 27 are operated simultaneously, it is determined that the M class 85 is to be enabled. When the M class 85 is enabled (YES at S12), the CPU 21 performs M class processing, which will be described below with reference to FIG. 7, in accordance with the M class 85 (S13). When the M class 85 is not enabled (NO at S12), the CPU 21 performs P class processing (S14). In the P class processing, the print processing is performed in a similar method to that of a known printer (For example, Japanese Laid-Open Patent Publication No. 2012-209786 discloses print processing, the relevant portions of which are herein incorporated by reference.). For example, based on the print data transmitted from the external device, the print processing of the print data is performed. Subsequently to S13 or S14, the CPU 21 ends the main processing.

With reference to FIG. 7, the M class processing performed at S13 will be described below. As described in FIG. 7, the CPU 21 establishes a connection with the image reading device 40 using the M class 85 (S20). The CPU 21 determines whether or not the power is turned OFF (S21). The CPU 21 determines that the power is turned OFF when the operation key 26 is operated. When the power is turned OFF (YES at S21), the CPU 21 performs OFF processing (S34). The CPU 21 ends the M class processing and returns the processing to the main processing in FIG. 6.

When the power has not been turned OFF (NO at S21), the CPU 21 determines whether or not there has been any data transfer from the external device (S22). When the image data are transferred from the image reading device 40 (S4 in FIG. 5), the CPU 21 determines that there has been a data transfer (YES at S22), and the CPU 21 stores the transferred image data in the DISK area 71 according to an instruction from the image reading device 40 (S23). The image reading device 40 of the present embodiment instructs the printer 10 to store the image data with a specific file name in a folder having a specific name. The specific name of the folder is a name corresponding to the external device and is, for example, a manufacturing company name of the external device ("brother", for example). When the folder 77 having the name corresponding to the external device does not exist in the DATA area 76 at S23, the CPU 21 creates the folder 77 having the name corresponding to the external device in the DATA area 76, and stores the image data in the created folder 77. The image reading device 40 of the present embodiment instructs use of the same file name as the specific file name for each processing. When the image data are already stored in the folder 77, the CPU 21 saves the image data transferred from the image reading device 40 at S22 by overwriting the existing image data. Thus, in the present embodiment, the image data transferred from the image reading device 40 are not stored in a plurality in the DATA area 76.

When other information is also transferred from the external device at S22, the CPU 21 determines that there has been a data transfer (YES at S22), and stores the transferred other information in the DATA area 76 of the DISK area 71 (S23). The other information includes the setting information and the type information, for example. The setting information can be distinguished from other information based on a file extension. The type information can be distinguished from other information based on the file extension.

The CPU 21 determines whether or not the information received at S22 is the setting information (S24). When it is determined that the information received at S22 is the setting information based on the file extension (YES at S24), the setting information stored in the DATA area 76 is stored in the EEPROM 24 so as to update the setting information (S25). The CPU 21 starts processing to perform communication using the communication system corresponding to the setting information (S26). For example, the CPU 21 performs the wireless LAN communication, in a similar method to a known method, based on the setting information relating to the wireless LAN communication that is stored in the EEPROM 24. (For example, Japanese Laid-Open Patent Publication No. 2012-209786 discloses wireless LAN communication, the relevant portions of which are herein incorporated by reference.).

When the information received at S22 is not the setting information (NO at S24) or after the processing at S26 is performed, the CPU 21 determines whether or not the information transferred at S22 is the type information (S27). When it is determined that the information received at S22 is the type information based on the file extension (YES at S27), the CPU 21 stores the type information in the FLASH ROM 23 (S28). When the information received at S22 is not the type information or after the processing at S28 is performed, the CPU 21 determines whether or not the print instruction has been received (S29).

In a state of being connected with the external device in accordance with the M class 85, when the operation key 26 is continuously operated for a certain period of time, the CPU 21 determines that the print instruction has been input. When the print instruction has not been received (NO at S29), the CPU 21 returns the processing to S21. When the print instruction has been received (YES at S29), the CPU 21 obtains the image data to be printed (S30). The CPU 21 of the present embodiment searches data in the folder having the specific name in the DATA area 76 so as to obtain the image data. Further, the CPU 21 of the present embodiment obtains the image data of the file format (the jpg format, for example) that is specified by the type information stored in the FLASH ROM 23. The image data 78 are obtained at S30, for example.

The CPU 21 converts the image data obtained at S30 into the print data (S31). The CPU 21 of the present embodiment performs image processing on the image data obtained at S30 and generates the print data used to print the image. Any known processing compatible with the printer may be adopted as the image processing. Because the printer 10 is a thermal printer, the CPU 21 performs binarization processing on the image data. The binarization processing is either simple binarization processing or error diffusion processing. The CPU 21 drives the print portion 25 and performs printing according to the print data generated at S31 (S32). The CPU 21 deletes the already printed image data 78 obtained at S30 from the folder 77 in the DATA area 76 (S33). After the processing at S33 is performed, the CPU 21 returns the processing to S21.

The printer 10 can perform the printing, while being directly USB-connected with the image reading device 40 without being connected through the PC, by using the existing "SCAN TO USB" function to store data in the USB memory provided in the image reading device 40. In other words, the printer 10 can perform the printing while being directly US B-connected with the image reading device 40, without being connected through the PC, without changing a configuration and specifications of the image reading device 40.

When the image reading device 40 stores data in the USB memory, normally, a folder is installed in the mass storage area of the USB memory, and the data is stored in the folder. The printer 10 obtains the image data from inside the folder 77 installed in the DISK area 71 at S30. As a result of this, the printer 10 can efficiently obtain the image data transmitted from the image reading device 40. When the image reading device 40 stores the data in the USB memory, normally, a folder having a specific name is installed in the mass storage area of the USB memory, and the data is stored in the folder. The printer 10 can efficiently obtain the image data 78 transmitted from the image reading device 40 at S30 by obtaining the image data 78 from the folder having the specific name.

The printer 10 according to the present embodiment can obtain, as the image data to be printed, the image data of the file format that can be printed by the print processing and which is specified by the type information. The printer 10 can generate the print data based on the image data and perform the print processing. Thus, it is not necessary for the image reading device 40, which transmits the image data, to perform the processing to generate the print data based on the image data. The printer 10 can perform the printing while being directly connected with the image reading device 40, without significantly changing the specifications of the image reading device 40.

Because the printer 10 deletes the already printed image data at S33, the print system 1 can reliably inhibit the already printed image data from being accumulated in the DATA area 76. Because only the image data for which the printing processing has not been performed are stored in the DATA area 76, when the image data are stored in the DATA area 76, it is not necessary to confirm whether or not the image data have been already printed. The printer 10 can reliably print the image data for which the print processing has not yet been performed.

When the printer 10 is connected with the external device using the mass storage class (the M class 85), the printer 10 can perform both the processing to set communication conditions with the external device based on the setting information (S25 and S26) and the print processing based on the image data transmitted from the external device (S32). Because the printer 10 can obtain the setting information directly from the external device via the USB cable 51, it is possible to reliably inhibit the setting information from being leaked to a third party in the course of communications. The user can change the setting information that includes character information for a plurality of items, even when the printer 10 does not have a display portion such as a liquid crystal display or the like that can display the setting information. The external device that sets the setting information and the external device that transmits the image data may be the same device or different devices.

By using an operation key that is used when the printer 10 is connected with the external device using the P class 84, the printer 10 can input an instruction to enable the M class 85 and the print instruction. Therefore, compared with a case in which the printer 10 is provided with a dedicated operation key to input the instruction to enable the M class 85, the printer 10 of the present embodiment can suppress an increase in manufacturing costs and a space for installing the dedicated operation key need not be secured.

The printer of the present disclosure is not limited to the above-described embodiment, and various changes and modifications are possible insofar as they are within the scope of the present disclosure. For example, modifications from (A) to (B) that will be described below may be applied to the printer of the present disclosure as necessary.

(A) The configuration of the printer 10 may be modified as necessary. Types and the number of the operations keys provided in the printer 10 may be changed as necessary. For example, the printer 10 may be provided with the dedicated operation key to input the instruction to enable the M class 85. The printer 10 may include a liquid crystal display and a touch panel, and may be configured to input instructions using the touch panel. Types and the number of the communication systems that can be performed by the printer 10 may be changed as necessary. For example, the printer 10 may be able to perform only the USB communication. The mass storage area need not necessarily be provided in the SRAM 22 but may be provided in another storage area, such as the FLASH ROM 23. It is sufficient that printer 10 include the connection portion 14 that can be USB-connected with the external device. The printer 10 need not necessarily be connected with the external device via the USB cable 51. Besides the image reading device 40, the external device may be an electronic black board, a measurement device such as an oscilloscope, and a PC, for example.

(B) Each of the steps of the main processing in FIG. 6 need not necessarily be performed by the CPU 21, but part or all of the steps may be performed by another electronic device (an ASIC, for example). Each of the steps of the above-described processing may be processed in a distributed manner by a plurality of electronic devices (a plurality of CPUs, for example). With respect to each of the steps of the main processing in the above-described embodiment, it is possible to change an order of the steps, omit a step, and add a step as necessary. The scope of the present disclosure includes a case in which part or all of the actual processing is performed by an operating system (OS) or the like that is operating on the printer 10, based on instructions from the CPU 21 of the printer 10, and the processing fulfills the function of the above-described embodiment. For example, modifications from (B-1) to (B-9) that will be described below may be applied to the main processing as necessary.

(B-1) The printer 10 need not necessarily be provided with the P class 84. In this case, the processing at S12 and S14 in FIG. 6 may be omitted.

(B-2) A configuration may be adopted in which plural pieces of image data can be stored in the DATA area 76. In this case, at S30 in FIG. 7, the CPU 21 may obtain all of the plural pieces of image data and may perform the print processing based on each piece of the image data. In this way, it is possible to reliably avoid a situation in which the print processing is not performed based on part of the image data. A printing order may be determined according to an order in which the image data are stored in the DATA area 76.

(B-3) When the plural pieces of image data are stored in the DATA area 76 at S30, the CPU 21 may perform processing to print thumbnails represented by each piece of image data. In this case, the CPU 21 generates the print data to print the thumbnails based on each piece of image data at S31. In this way, the user can have a general understanding of what kind of image data have been obtained so far by referring to the recording media for which the printing has been already performed. This is particularly effective in a case when there are many pieces of the image data stored in the DATA area 76 and the printing does not have to be performed based on all pieces of the image data, or in a case when the user wants to have an overview of printing results in advance.

(B-4) When the plural pieces of the image data are stored in the DATA area 76 at S30, the CPU 21 may obtain only the image data that satisfy predetermined conditions. The predetermined conditions may be conditions selected from the folder name, the file format, a recording order, and the file size, for example. The predetermined conditions may be specified in advance, or the user may be able to set the predetermined conditions. When the user can set the predetermined conditions, the user may be able to change the setting by performing processing similar to the processing at S27 and S28, for example. For example, based on the predetermined conditions, the CPU 21 may obtain the oldest image data according to the recording order in the folder having the specific name.

At S30, the CPU 21 may obtain the image data by searching for the image data, following a predetermined order, so as to determine whether or not the image data are stored. Specifically, when three folders, namely, a folder A, a folder B, and a folder C are stored in the DATA area 76, the CPU 21 may search for the image data so as to determine whether or not the image data are stored, following the order starting from the folder A, the folder B, and the folder C. When the CPU 21 of the present embodiment searches for the image data in the predetermined order, the CPU 21 is only required to search the RDE area and the FAT area. The printer 10 does not have the display portion by which the user can select the image data that the user wants to print. Thus, by setting the predetermined order as necessary, in the printer 10 also, it is possible to increase the possibility of obtaining the image data that the user wants to print at S30. The folder in which the image data are stored may be a folder in which the image data are stored hierarchically while taking into account the predetermined order for searching. In this case, the CPU 21 can efficiently obtain the image data by searching for the image data according to the predetermined order.

(B-5) The processing at S33 may be omitted. In this way, when the user wants to perform the printing processing based on the same image data a plurality of times, it is possible to avoid a situation in which the image data are deleted unintentionally. At S33, the user may be able to select whether or not to delete the already printed image data. In this way, according to the user's selection, it is possible to avoid accumulating unnecessary image data in the DATA area 76. At S33, instead of deleting the image data, the CPU 21 may store information indicating that the printing has been already performed for the image data based on the image data obtained at S30. In this way, when the plural pieces of the image data are stored in the DATA area 76, it is possible to distinguish the already printed image data from the image data for which the printing has not yet been performed.

(B-6) The processing from S24 to S26 may be omitted as necessary. The processing from S27 to S28 may be omitted as necessary. When the image data stored at S23 are the print data, the processing at S31 may be omitted. At S30, the CPU 21 may obtain the image data by searching for the image data targeting all the data in the mass storage area. In this way, even when the CPU 21 does not specify the folder name in which the image data are stored, or when the CPU 21 does not specify the file format of the image data, the CPU 21 can obtain the image data transmitted by the external device.

(B-7) When the image data have not been obtained at S30, the CPU 21 may display an error indication on the display portion 15. The error may be indicated by causing the display portion 15 to flash repeatedly at a predetermined frequency, for example. In this way, the user can be informed that a state has arisen in which it is not possible to obtain the image data from the DATA area 76. When the image data obtained at S30 are the image data with a file extension that cannot be converted into the print data, the CPU 21 may display an error indication on the display portion 15. The error may be indicated by causing the LED to flash repeatedly at a predetermined frequency on the display portion 15, for example. In this way, the user can be informed that a state has arisen in which there are no image data that can be converted into the print data in the DATA area 76.

(B-8) When the data transferred at S22 are the image data, the CPU 21 may perform the printing based on the image data without receiving the print instruction (S31 and S32). In this way, it is possible to save the user's time and effort to give the print instruction and also possible to shorten a time required to obtain the recording medium on which the printing has been already performed based on the image data.

(B-9) The CPU 21 may create a folder that stores the image data that may be printed (hereinafter referred to as a "print candidate folder") and a folder that stores the image data that are not going to be printed (hereinafter referred to as a "non-print target folder"). More specifically, at S23, the CPU 21 may create the print candidate folder or the non-print target folder based on an instruction from the external device, and may store the image data in the created folders. In this case, when the CPU 21 detects the print instruction (YES at S29), the CPU 21 may obtain the image data to be printed from inside a folder stored in the print candidate folder (S30). The CPU 21 may receive, from the external device or the operation keys 26 and 27, an instruction to change the print candidate folder to the non-print target folder or an instruction to change the non-print target folder to the print candidate folder, and may change an attribute of the folder accordingly. In this way, while storing the image data that do not need to be printed, when it becomes necessary to print such image data afterwards, the printer can perform the printing of the image data as necessary. The CPU 21 may store data other than the image data in the non-print target folder according to an instruction from the external device.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:
1. A printer comprising:
   a print portion configured to perform printing on a recording medium;
   a connection portion configured to be USB-connected with an external device;

a storage device having a mass storage area accessible by the external device connected via the connection portion;

a processor; and a memory configured to store computer-readable instructions that, when executed by the processor, instruct the processor to perform processes comprising:

establishing a connection with the external device via the connection portion, using a mass storage class, the mass storage class being able to cause the external device to recognize the printer as a mass storage device when the external device is USB-connected to the printer;

storing image data in a folder in the mass storage area, using the mass storage class, the image data being data representing an image, the image data being written by the external device, the image data being transmitted from the external device via the connection portion, the folder having a name corresponding to the USB-connected external device;

obtaining the image data to be printed from among data stored in the folder of the mass storage area; and while the mass storage class is enabled and without requiring enablement of a printer class driver and without requiring a command transmitted from the USB-connected external device, printing the image on the recording medium by controlling the print portion based on the stored image data written by the external device.

2. The printer according to claim 1, wherein the obtaining includes obtaining the image data of a specific file format.

3. The printer according to claim 1, wherein:
the computer-readable instructions further instruct the processor to perform the processes comprising:
generating print data to print the image by performing image processing on the obtained image data; and
the printing includes printing the image on the recording medium by controlling the print portion based on the generated print data.

4. The printer according to claim 1, wherein
the computer-readable instructions further instruct the processor to perform the processes comprising:
deleting, from the mass storage area, the image data for which printing has been already performed.

5. The printer according to claim 1, wherein
the computer-readable instructions further instruct the processor to perform processes comprising:
storing setting information in the mass storage area, the setting information being information required by the external device to perform communication based on a specific communication system and being transmitted from the connected external device;
receiving an instruction transmitted from the external device, by using the setting information stored in the mass storage area and performing communication with the external device based on the specific communication system; and
performing control according to the instruction when the instruction is received.

6. A non-transitory computer-readable medium storing computer-readable instructions that, when executed, instruct a processor of a printer to perform processes comprising:
establishing a connection with an external device via a connection portion of the printer using a mass storage class, the connection portion being configured to be USB-connected with the external device, the mass storage class being able to cause the external device to recognize the printer as a mass storage device when the external device is USB-connected to the printer;

storing image data in a folder in a mass storage area of a storage device of the printer, using the mass storage class, the image data being data representing an image, the image data being written by the external device, the image data being transmitted by the external device via the connection portion, the mass storage area being accessible by the external device connected via the connection portion, the folder having a name corresponding to the USB-connected external device;

obtaining the image data to be printed from among data stored in the folder of the mass storage area; and while the mass storage class is enabled and without requiring enablement of a printer class driver and without requiring a command transmitted from the USB-connected external device, printing the image on a recording medium by controlling a print portion of the printer based on the stored image data written by the external device, the print portion being configured to perform printing on the recording medium.

7. The non-transitory computer-readable medium according to claim 6, wherein
the obtaining includes obtaining the image data of a specific file format.

8. The non-transitory computer-readable medium according to claim 6, wherein:
the computer-readable instructions further instruct the processor to perform processes comprising:
generating print data to print the image by performing image processing on the obtained image data; and
the printing includes printing the image on the recording medium by controlling the print portion based on the generated print data.

9. The non-transitory computer-readable medium according to claim 6, wherein
the computer-readable instructions further instruct the processor to perform processes comprising:
deleting, from the mass storage area, the image data for which printing has been already performed.

10. The non-transitory computer-readable medium according to claim 6, wherein
the computer-readable instructions further instruct the processor to perform processes comprising:
storing setting information in the mass storage area, the setting information being information required by the external device to perform communication based on a specific communication system and being transmitted from the connected external device;
receiving an instruction transmitted from the external device, by using the setting information stored in the mass storage area and performing communication with the external device based on the specific communication system; and
performing control according to the instruction when the instruction is received.

* * * * *